(No Model.)
C. TURNER.
STEW PAN.
No. 477,974. Patented June 28, 1892.
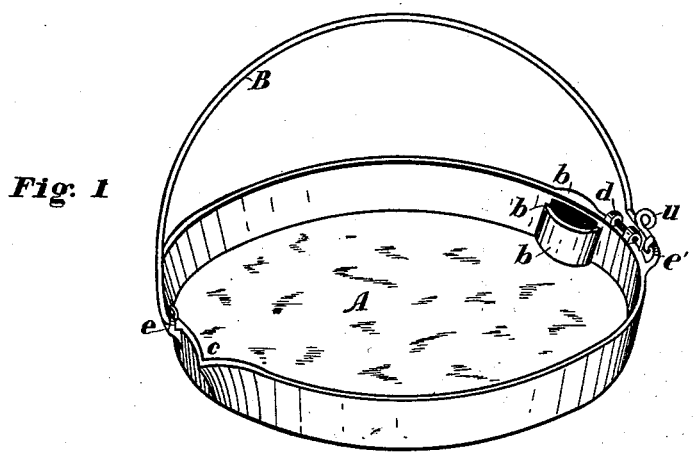
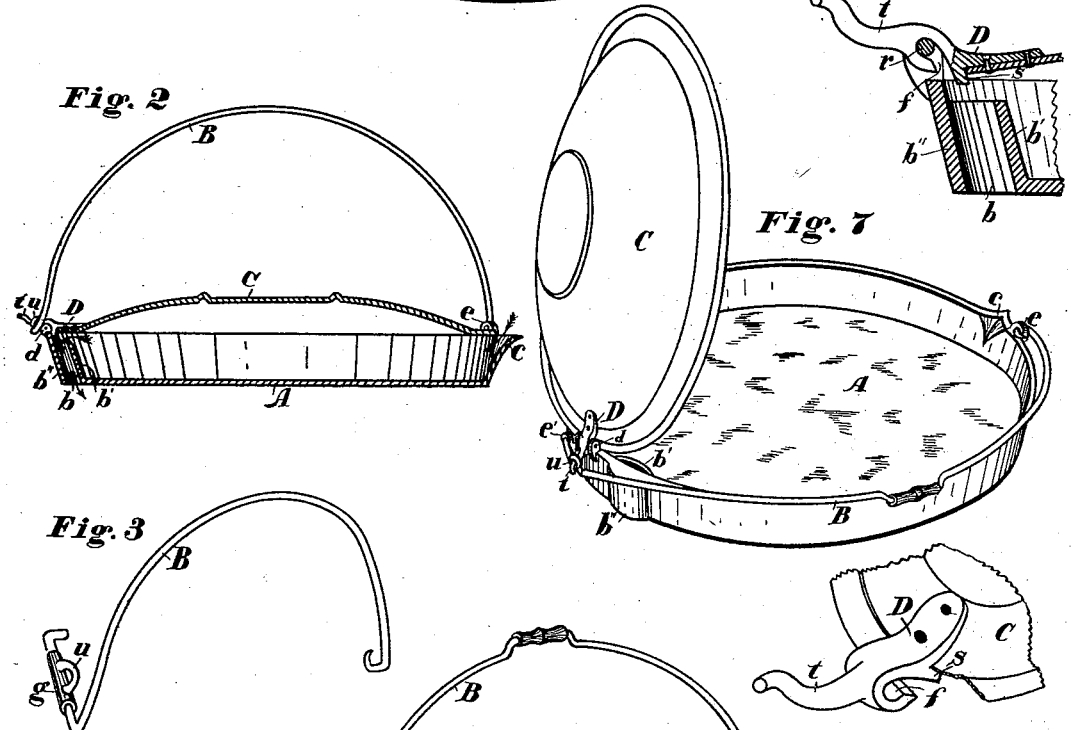
Witnesses:
W. H. Aiken
John H. Bacon
Inventor.
Calvin Turner

UNITED STATES PATENT OFFICE.

CALVIN TURNER, OF BANGOR, MAINE.

STEW-PAN.

SPECIFICATION forming part of Letters Patent No. 477,974, dated June 28, 1892.

Application filed December 14, 1891. Serial No. 415,069. (No model.)

*To all whom it may concern:*

Be it known that I, CALVIN TURNER, a citizen of the United States, residing at Bangor, in the county of Penobscot and State of Maine, have invented a new and useful Stew-Pan; and I do hereby declare that the following is a full, clear, and exact description of the invention, which will enable others skilled in the art to which it appertains to make and use the same.

My invention relates to a new and useful odorless stew-pan; and it consists of an improved covered pan constructed with a vent and draft opening, through which the odors from cooking pass by means of the draft through the stove and up the chimney, and is also provided with a bail-operating cover having detachable hinge, as will hereinafter be fully set forth and described.

Throughout the description reference is made to the accompanying drawings, in which—

Figure 1 represents a perspective view of my improved pan with cover removed. Fig. 2 shows a sectional elevation of my invention. Fig. 3 is a cabinet projection of the bail of my device, showing cover-operating attachment thereon. Fig. 4 is a cabinet projection of the cover-operating attachment removed from the bail. Fig. 5 shows a perspective view of my improved pan complete with cover closed. Fig. 6 is a sectional elevation of a portion of pan through vent-opening, showing detachable hinge. Fig. 7 is a perspective view of my invention complete, showing the cover in a raised position. Fig. 8 shows a perspective view of a portion of cover with detachable hinge thereon.

Similar letters of reference refer to correspondingly like parts throughout the different figures.

Referring to the drawings, A represents a pan with either straight or sloping sides, constructed with a projecting nose $c$, a bail-ear $e$ near said nose, and a second bail-ear $e'$ and projecting hinge-lugs $d\ d$ diagonally opposite.

Located near or directly under the hinge-lugs $d\ d$ is a vent-opening through the side of the pan A, which opening extends downward and out at the bottom of the pan and is inclosed on both sides by an arched wall $b'$ and $b''$, as shown in Figs. 1, 2, 6, 7, and 5 of the drawings. This opening $b$ serves as the vent, through which the odors from within the pan pass into the stove by a created draft, hereinafter to be explained. The hinge-lugs $d\ d$, near the bail-ear $e'$, are provided with a rivet $r$ therein, as shown in Figs. 1 and 6, by means of which the cover of my device is attached.

The cover of my device (represented by the letter C in the drawings) covers the entire top of the pan A with the exception of the nose $c$, the top of which is left open for the purpose of allowing an inlet of fresh air to the cooking articles, and a draft is thus created across the pan down through the draft-opening $b$, diametrically opposite, into the stove. This cover C is hinged to the pan A by the means of a hinge attachment D, riveted thereto, provided with a curved slot $f$, adapted to hook over the rivet $r$ in the lugs $d\ d$. This hinge attachment D is provided with a projection $t$, extending beyond its hinge connection, which projection is bent in the form of a reverse curve and the end of which is turned to one side to admit of its being operated by the bail of my device, as will hereinafter be shown. A small leg $s$ extends downward from the edge of the cover C of the hinge attachment D and rests against the inside edge of the pan A when the cover is closed to prevent the latter from becoming unhinged when operating the same by the bail.

The bail B of my invention is constructed from a strip of wire of sufficient size, having its ends hooked to enter the bail-ears of the pan A, to which it is connected. The end of the bail B from where it connects with the bail-ear $e'$ extends for a short distance at right angles and then is curved upward over the top of the pan to the ear $e$, diametrically opposite. Upon this right-angle portion of the bail B is placed a small casting $g$, (shown in Figs. 3 and 4 of the drawings,) which is provided with an upwardly-extending loop or eye $u$, of sufficient size to admit the projecting end of the hinge attachment D of the cover C. To obviate the necessity of the independent casting $g$, if desired, the bail-wire could be covered to form the eye $u$, as shown in Fig. 1 of the drawings, and the projection $t$ of the hinge attachment passes through the eye thus formed to operate the cover in exactly the same manner.

The operation of my device is as follows: With the cover C closed over the top of the pan A and the projecting end of the hinge attachment D entering the eye *u* of the bail B, the latter will necessarily stand in a vertical position. Now to look into the pan by moving the bail B to one side this eye *u*, pressing upon the projecting end *t*, will depress the latter to raise the cover C, and will hold the same until the position of the bail is changed.

In pouring out a liquid the operation will press the cover C firmly against the edge of the pan by the weight of the latter depending from the bail, causing the right-angle portion of said bail to bear against the under side of the cover projection *t*.

Having described my invention, what I claim, and desire to secure by Letters Patent of the United States, is—

1. An improved stew-pan consisting of the combination of a pan provided with bail-ears and protruding hinge-lugs connected by a rivet, with a detachably-hinged cover having a hinge projection with a curved slot and a reverse curved extension beyond said slot, and a curved bail attached to the bail-ears provided with a right-angle portion containing an eye adapted to engage the extension on the cover to operate the latter, substantially in the manner shown and described.

2. In a stew-pan having a hinged cover provided with a reverse curved extension protruding from the hinged side, an improved operating-bail having means for connecting with the bail-ears, said bail curved for a sufficient height over the top of pan and having one of its ends terminating for a short distance in a plane at right angles with the projection of the bail, and a hollow casting provided with an eye located upon the right-angle portion, for the purpose described, and substantially as shown and set forth.

3. In combination with a pan or other kettle provided with a bail and having hinge-lugs connected by a rivet near said bail, a detachably-hinged cover for the same, consisting of a cover provided with a casting D, having a slot therein adapted to engage the rivet in the hinge-lugs, said casting having a further extension beyond said slot, for the purpose described, and substantially as shown and set forth.

CALVIN TURNER.

Witnesses:
W. H. AIKEN,
JOHN H. BACON.